United States Patent [19]

Zabar et al.

[11] Patent Number: 4,742,243

[45] Date of Patent: May 3, 1988

[54] POWER CONSOLIDATION CIRCUIT USING INTERRUPTED CURRENT TECHNIQUES

[76] Inventors: Zivan Zabar, 99-72 66th Rd. Apt. 9N, Forest Hills, N.Y. 11375; Howard M. Abramowitz, 8 Curtis Ave., West Orange, N.J. 07052

[21] Appl. No.: 14,192

[22] Filed: Feb. 6, 1987

Related U.S. Application Data

[63] Continuation of Ser. No. 480,502, Mar. 30, 1983, abandoned.

[51] Int. Cl.$^4$ ................................................ H02J 1/00
[52] U.S. Cl. ......................................... 307/81; 307/85; 307/43
[58] Field of Search ....................... 307/43, 44, 75, 80, 307/81, 85; 323/906

[56] References Cited

U.S. PATENT DOCUMENTS

| | | | |
|---|---|---|---|
| 3,493,777 | 2/1970 | Richards | 307/80 X |
| 3,769,571 | 10/1973 | Wilkinson | 307/75 X |
| 4,101,787 | 7/1978 | Vail | 307/81 |
| 4,175,249 | 4/1979 | Gruber | 323/906 X |
| 4,297,590 | 10/1981 | Vail | 307/43 |
| 4,456,833 | 6/1984 | Traub et al. | 307/80 |
| 4,476,520 | 10/1984 | Gallemore | 323/906 X |
| 4,591,965 | 5/1986 | Dickerson | 323/906 X |

FOREIGN PATENT DOCUMENTS 610242  6/1978  U.S.S.R. ................................ 307/85

*Primary Examiner*—A. D. Pellinen
*Assistant Examiner*—Derek S. Jennings
*Attorney, Agent, or Firm*—Ostrolenk, Faber, Gerb & Soffen

[57] ABSTRACT

An electric circuit consolidates electric power from a number of power sources, having various voltage levels and connected to form a grid and delivers the power to a common load. This is accomplished by interposing switching elements in the connection or nodes between the terminals of the grid and the busbars that feed the load. These switches operate in a manner such that all the sources contribute to the output power. However, at any given time, only two nodes on the grid are connected to the load. Alternating current is derived from a direct current grid by using sets of switching elements to reverse polarity of the voltage supplied to the load.

2 Claims, 2 Drawing Sheets

POWER CONSOLIDATION CIRCUIT USING INTERRUPTED CURRENT TECHNIQUES

This is a continuation of application Ser. No. 480,502 filed on Mar. 30, 1983, in the name of Zivan Zabar and Dr. Howard Abramowitz, for Power Consolidation Circuit Using Interrupted Current Techniques.

SUMMARY OF THE INVENTION

Connecting electrical-energy power-sources in parallel to feed a common load can be done efficiently only when their voltage levels are identical. Otherwise an internal current flows among the various sources dissipating energy in them, and thereby reducing the available output power.

In many cases such as photovoltaic cells, fuel cells, MagnetoHydroDynamic (MHD) channel etc., parallel connection of the many terminals involves the use of either additional absorbing (reactances) or blocking (diodes) components to reduce internal currents while at the same time allowing continuous flow of current to the load. The subject invention consists of a power consolidation scheme which utilizes individual switching elements, such as thyristors, transistors, triacs, gate-turn-off (GTO's) devices, mercury vapor valves, vacuum tubes and relays, to connect the sources' terminals to a common load while, at the same time, preventing the internal current circulation.

The invention relates to an apparatus which consolidates electric power from a number of sources having various voltage levels and feeds it to a common load. The sources, which may or may not interact with one another, are so connected as to form a grid of meshes consisting of at least three branches and an equal or larger number of nodes. Each branch may contain a power source element, so that the nodes may serve as common points between two or more sources. The power consolidation is accomplished by connecting each node through individual switching elements to the busbars that feed the load. The consolidation is performed by using interrupted current techniques that is, the switches are sequentially fired to connect any two nodes at one time to the load. This switching sequence is repeated in a cyclic fashion determined by system requirements so that within each cycle, each source contributes to the output power but only during a fraction of the cycle.

In the case of sources, such as solar cells, fuel cells, and batteries, which have no internal connections, the sources can be arranged in an array that is, two or more sources in a parallel connection. In an array arrangement, all source terminals of one polarity can be connected directly to one bar. In contrast, the apparatus of the present invention is more complex and not connectable in an array configuration. The sources contemplated herein are, for example, electrode segments of an MHD generator in which each mesh consists of four branches and four nodes that is, in one mesh there exists two horizontal voltage sources, called Hall voltages, and two vertical sources. The sources interact with one another such that, for example, the potentials of the horizontal sources are governed by the current in the vertical sources and vice versa.

Two advantages accrue naturally from this invention. (1) regulation of the output power by varying the conduction period of the individual switches (pulse width modulation), and (2) feasibility of generating a high frequency alternating current (AC) system. This permits sectionalization of the power-source system into groups and further consolidation of power by means of isolating transformers.

Another advantage of the scheme is the prompt disconnection from the system of faulty source elements.

The number of nodes participating in the consolidation scheme will be a function of the power handling capability of the sources, and the heat capacity and cooling rate of the physical realization of each node and switch.

Accordingly, the primary objective of the invention is to consolidate electric power from a grid configuration of sources to a common load.

Another objective of the invention is to individually control the power delivered by each source. Power is regulated by adjusting the pulse width of the appropriate switching devices.

Still another objective of the invention is to reduce the potential for catastrophic failure by disconnecting individual damaged sources while allowing continuing operation of the remainder of the system.

A further objective of the invention is to provide an alternating-current power system, either directly from the existing switches of the consolidation circuit or with the aid of added static inverters, thereby allowing further consolidation of power by means of isolating transformers. Still a further objective of the invention is to reduce the cost and size of the complete system by employing a high switching frequency, thereby minimizing the number and size of energy absorbing inductances.

The switching power consolidation scheme applies to an array, as well as to a grid connection of electric energy sources having different voltage levels.

BRIEF DESCRIPTION OF THE DRAWINGS

The aforementioned objectives and advantages of the invention will be appreciated from the following description and accompanying drawing wherein.

DESCRIPTION OF THE PREFERRED EMBODIMENT

Figure 3:
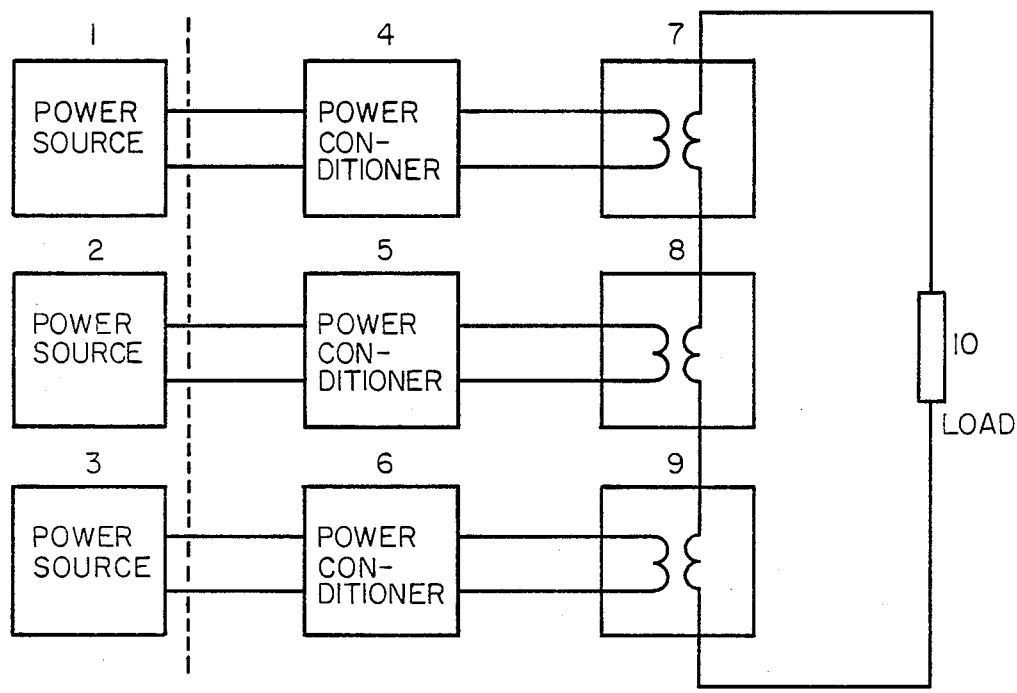
Figure 1:
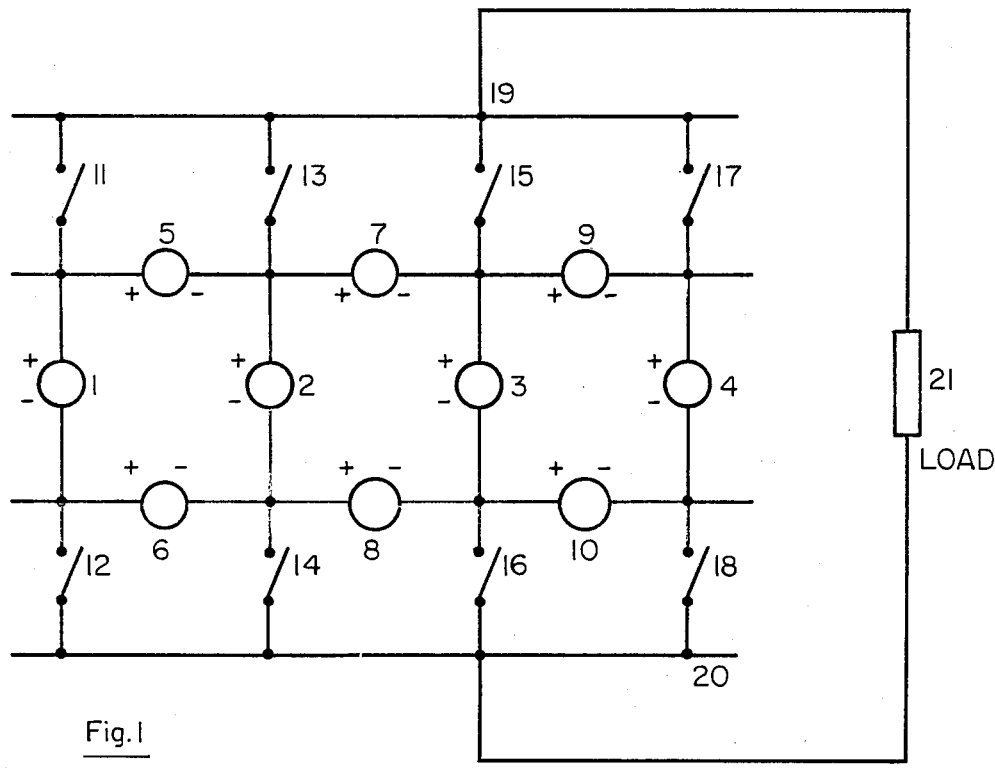
FIG. 1 gives the schematic diagram of a grid of power sources using individual switch per mode.

Referring now in greater detail to the drawings, FIG. 1 describes a grid connection of ten power sources. Sources 1 through 10 may have arbitrary voltages provided that the overall mesh voltages vanish in order to avoid internally circulating currents. An important example of such a grid connection of sources is an MHD channel (generator). In this case, the vertical sources, 1 through 4, model a discrete representation of the Faraday voltages and the horizontal sources, 5 through 10, model a discrete representation of the Hall voltages. When the eight switches 11 through 18 are open, there is no external current in the system. In order to prevent a short-current situation when the switches are closed (for instance—if switches 11 and 13 are closed simultaneously, source 5 will be short-circuited), the switches close in pairs of opposite polarity, so that only one pair is closed at a time. When switches 11 and 12 are closed, all the other switches are open. When switches 13 and 14 are closed, 11 and 12 open (the rest stay open), and so on. The load 21, which is connected between the common bus bar points 19 and 20, is fed by one source at a time except for a relatively short commutation period between switching change (in which it is fed by two power sources). A group may have more, or less, power sources than is shown in FIG. 1. The frequency and the pulse width, i.e. the on state time of each pair of switches in one cycle, can be made to vary depending on the application and/or ssytem requirements.

In the case of an array of sources, such as solar cells, fuel cells and batteries, which have no internal connection (such as sources 5 through 10 in FIG. 1), all sources (1 through 4) terminals of negative polarity can be connected directly to the common bus bar 20 (eliminating switches 12, 14, 16 and 18) and only those of the positive polarity must be connected to the other bus bar 19 by interposing the switching elements 11, 13, 15 and 17.

Figure 2:
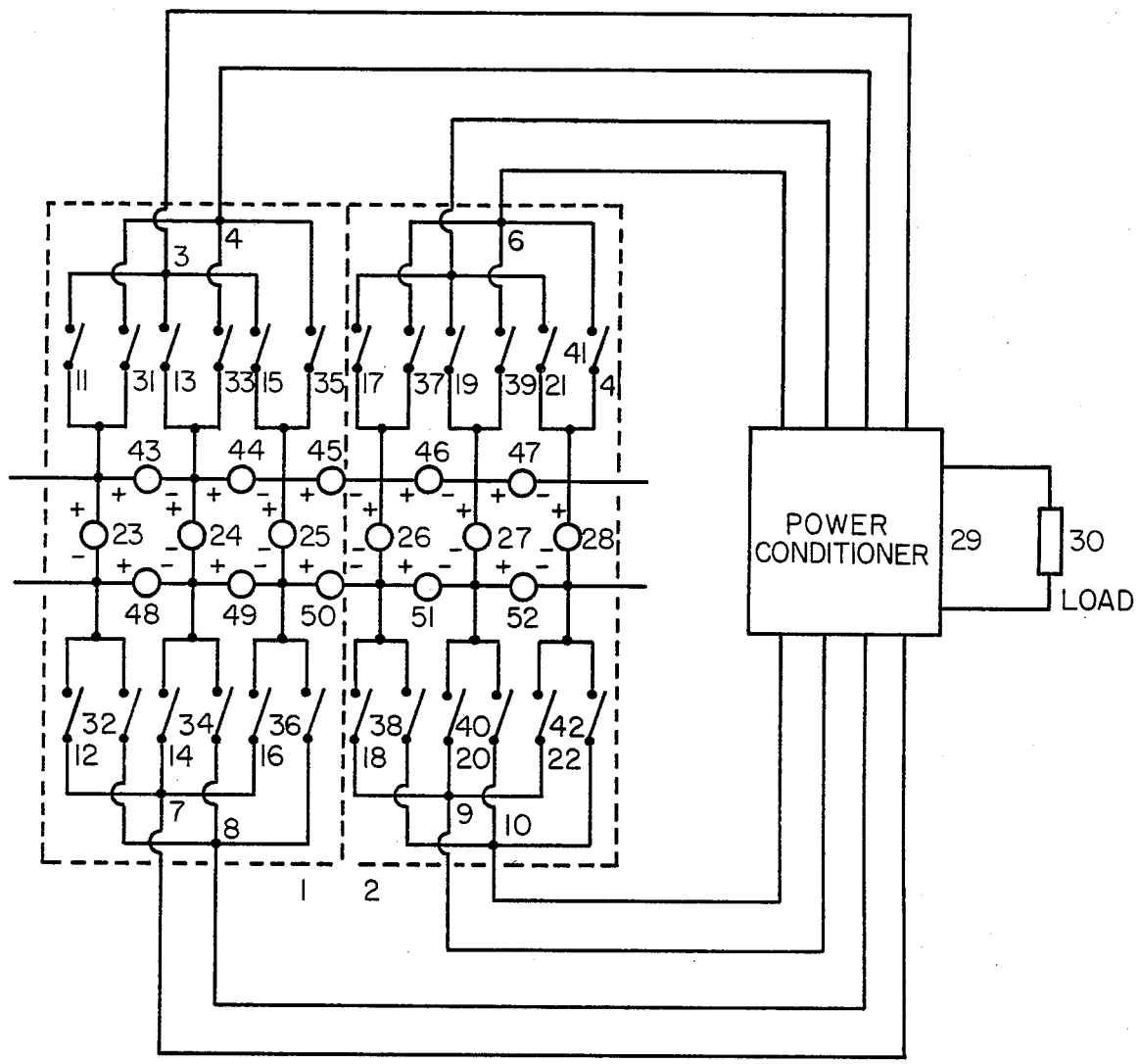
FIG. 2 indicates a particular way of sectionalizing and grouping the nice configuration.

FIG. 2 illustrates six vertical sources, 23 through 28, and ten horizontal sources, 43 through 52, arranged in two groups, 1 and 2. Each group is sectionalized into two subroups. In group 1: the first subgroup is designated by the bus bar pair 3-7 and the second one by the pair 4-8; In group 2: the third subgroup is designated by the bus bar pair 5-9 and the fourth one by the pair 6-10. Each source connects to two subgroups through two sets of switches. In group 1, subgroup 3-7 is supplied by switches 11 through 16 (busbar 3 is fed by switches 11, 13 and 15, while busbar 7 is fed by switches 12, 14 and 16); subgroup 4-8 is supplied by switches 31 through 36. In group 2, subgroup 5-9 is supplied by switches 17 through 22; and subgroup 6-10 by switches 37 through 42. The switching arrangement of each subgroup was described in FIG. 1. The power supply system may include more power sources, groups and subgroups than is shown in FIG. 2. The terminals of subgroup 3-7, 4-8, 5-9 and 6-10 lead to a power conditioner 29 which may include additional switches and isolating transformers and connects to a common load 30.

A second arrangement will eliminate any additional switches in the power conditioner 29 and provide direct AC power to the load. In this case, the power conditioner 29 will include only isolating transformers and the subgroup's switching elements will interrupt the DC current flow in an alternating manner to provide an AC output power to the load 30.

The switches' firing sequence of a group (or subgroup), shown in FIG. 1, is performed in the following manner:

Step 1: The pair 11 and 12 is fired simultaneously while all the others are fire-suppressed. The load current is supplied mainly by source 1, to a lesser extent also by sources 2 to 10.

Step 2: After a specific period of time, which is a function of system conditions and/or requirements, the pair 13 and 14 is fired simultaneously while all the rest are fire-suppressed. The load current is supplied mainly by source 2, to a lesser extent also by source 1 and sources 3 to 10.

The switching times between steps 1 and 2 are overlapping to maintain a continuous current to the load. Interrupting current flow and forcing switching dead time (no switching overlap time) is also possible if required by the loading characteristics and the supplies being consolidated. When the firing sequence reaches the pair 17 and 18, it returns to the start and continues in a system selected order.

I claim:

1. A power consolidation circuit for consolidating power from a MHD (Magneto Hydrodynamic) channel, comprising:

a plurality of pairs of electrical nodes, each pair of nodes including a first node of a first electrical polarity and a second node of a second electrical polarity, said pairs of nodes being spaced along said MHD channel, a plurality of vertical sources and a plurality of horizontal sources, representing respectively Faraday and Hall voltages associated with said MHD channel, each respective one of said vertical sources extending between a respective pair of said pairs of nodes and a respective one of said horizontal sources extending between adjacent ones of said first nodes or adjacent ones of said second nodes, said MHD channel being of the type in which interconnection of said first nodes to one another or said second nodes to one another produces undesired internal short circuit currents within said MHD channel;

first and second power bus bars;

a first group of normally open switches, each one of said switches in said first group of switches extending between a respective one of said first nodes and said first power bus bar;

a second group of normally open switches, each one of said switches in said second group of switches extending between a respective one of said second nodes and said second power bus bar; and said normally open switches being turned on in pairs and sequentially following one another in repeated cycles so that electrical power is derived from said MHD channel in sequence and cyclically through said pairs of nodes, in a manner such that power flows discontinuously from any one of said pairs of nodes and only during a predetermined fraction of a cycle period asociated with said MHD channel at the end of which cycle all said switches will have been turned on.

2. A power consolidation circuit as in claim 1, in which each pair of said switches is turned on only after a previously turned on pair of switches has fully turned off.

* * * * *